(12) United States Patent
Etherton et al.

(10) Patent No.: US 7,829,641 B2
(45) Date of Patent: Nov. 9, 2010

(54) PROCESS FOR THE PREPARATION OF MULTIMODAL POLYETHYLENE RESINS

(75) Inventors: Bradley P. Etherton, Cincinnati, OH (US); Stephen M. Imfeld, Mason, OH (US); Philip J. Garrison, Houston, TX (US)

(73) Assignee: Equistar Chemicals, LP, Houston, TX (US)

( * ) Notice: Subject to any disclaimer, the term of this patent is extended or adjusted under 35 U.S.C. 154(b) by 6 days.

(21) Appl. No.: 12/218,597

(22) Filed: Jul. 16, 2008

(65) Prior Publication Data

US 2010/0016526 A1    Jan. 21, 2010

(51) Int. Cl.
*C08F 4/64*    (2006.01)
*C08F 4/76*    (2006.01)
*C08F 4/52*    (2006.01)
*C08F 2/00*    (2006.01)

(52) U.S. Cl. .................. 526/118; 526/119; 526/65; 526/172; 526/170; 526/160; 526/161; 526/348; 526/130

(58) Field of Classification Search .................. 526/118, 526/119, 160, 943, 901, 172, 65, 161
See application file for complete search history.

(56) References Cited

U.S. PATENT DOCUMENTS

| | | | |
|---|---|---|---|
| 5,747,594 A | 5/1998 | deGroot et al. | |
| 6,211,311 B1 | 4/2001 | Wang et al. | |
| 6,232,260 B1 | 5/2001 | Nagy et al. | |
| 6,372,864 B1 | 4/2002 | Brown | |
| 6,486,270 B1 | 11/2002 | Garrison et al. | |
| 6,552,150 B1 | 4/2003 | Nummila-Pakarinen et al. | |
| 6,566,450 B2 | 5/2003 | Debras et al. | |
| 6,794,468 B1 | 9/2004 | Wang | |
| 6,838,410 B2 | 1/2005 | Wang et al. | |
| 6,861,485 B2 * | 3/2005 | Wang | 526/119 |
| 6,995,216 B2 | 2/2006 | Winslow et al. | |
| 2007/0055021 A1 * | 3/2007 | Chandrashekar et al. | 525/240 |
| 2007/0293639 A1 | 12/2007 | Nagy et al. | |

FOREIGN PATENT DOCUMENTS

WO    WO 01/53360    7/2001

OTHER PUBLICATIONS

Wong, Anthony Chi-Ying: "Study of the Relationship Between Melt Index, Density and Blend Ratio of Binary Polyethylene Blends" *Polymer Eng.& Sci*: vol. 31 (21), pp. 1549-1552 *(Mid-Nov. 1991).

* cited by examiner

*Primary Examiner*—Rip A. Lee
(74) *Attorney, Agent, or Firm*—Shao-Hua Guo

(57) ABSTRACT

A two-stage cascade polymerization process for the production of multimodal polyethylene film resins with improved bubble stability is provided. The process comprises polymerizing ethylene or a mixture of ethylene and a $C_{4-8}$ α-olefin in two reactors arranged in series using a mixed single-site catalyst comprised of a bridged and a non-bridged indenoindolyl transition metal complex to form a multimodal polyethylene resin comprised of a lower molecular weight, higher density component and a higher molecular weight, lower density component.

9 Claims, No Drawings

PROCESS FOR THE PREPARATION OF MULTIMODAL POLYETHYLENE RESINS

FIELD OF THE INVENTION

The invention relates to a process for the preparation of multimodal polyethylene resins useful for the production of films. More specifically, the invention relates to a process whereby polyethylene resins having improved processability are produced using specific mixed indenoindolyl catalysts in two reactors and to the multimodal resins produced thereby.

BACKGROUND OF THE INVENTION

Medium to high density polyethylene (PE) resins having a bimodal or multimodal molecular weight distribution are known and widely utilized within the film industry. The use of PE resins having at least two different molecular weight components and/or components which differ structurally from each other is particularly desirable for the production of films where, by judicious selection and design of the resin components, film properties and processability can be balanced.

Multimodal high molecular weight, high density polyethylene (HMW HDPE) resins are particularly useful for the production of thin films such as those used for tee-shirt bags, merchandise and produce bags and the like. Such thin films are typically blown using high stalk or high neck processes as described in U.S. Pat. No. 6,552,150. The resins employed must not only be capable of being drawn down into thin gauges, but must also have the ability to be extruded at high rates. The latter, i.e., film output, is often limited by either stability of the blown film bubble or by pressure limitations in the extruder.

Multimodal PE resins and processes for their preparation in multiple reactor systems are known. For example, a two-stage ethylene polymerization process wherein different catalysts are employed in the first and second stages is described in U.S. Pat. No. 5,747,594. A single-site catalyst is utilized in the first stage and a Ziegler catalyst is used in the second stage.

A dual reactor process for the polymerization of ethylene using single-site catalysts but with different activators in the first and second reactors is disclosed in U.S. Pat. No. 6,372,864.

Whereas processes of the above types yield resins comprised of polymers of differing molecular weights, the use of different types of catalysts and/or different activators presents operational problems.

U.S. Pat. No. 6,995,216 discloses a process for the production of broad molecular weight distribution or bimodal HDPE, linear low density polyethylene (LLDPE) and medium density polyethylene (MDPE) resins using a bridged indenoindolyl ligand-containing Group 4 transition metal complex and an activator. The process can be carried out in multiple stages or in multiple reactors. The same complex and activator are used in all stages or reactors.

Multimodal PE resins and processes for their preparation using two or more single site catalysts are disclosed in published U.S. patent application 2007/0055021A. The reference generally discloses the polymerization of ethylene and an α-olefin comonomer in either single or multiple reactor(s) arranged in parallel or in series to form a multimodal HDPE or MDPE in one stage and a multimodal LLDPE or ultra low density polyethylene (ULDPE) in a second stage. In one embodiment the single site catalysts used are indenoindolyl catalysts and in another embodiment a mixture of bridged and non-bridged indenoindolyl catalysts is employed.

We have now unexpectedly discovered a process whereby multimodal PE resins which have a unique balance of properties rendering them useful in high stalk blown film processes are produced utilizing a specific combination of bridged and non-bridged indenoindolyl catalysts.

SUMMARY OF THE INVENTION

The present invention relates to a process for the production of multimodal polyethylene resins which are particularly well suited for blown film applications. The process comprises polymerizing ethylene or a mixture of ethylene and a $C_{3-8}$ α-olefin in two reactors in the presence of a mixed indenoindolyl single site catalyst comprised of non-bridged and bridged indenoindolyl transition metal complexes. More specifically, a first polyethylene resin having a density of 0.942 g/cm$^3$ or higher and melt index from 0.1 to 10 g/10 min is produced in the first reactor. Polymerization in the second reactor is carried out under different conditions to produce a second polyethylene resin of lower density and higher molecular weight to obtain the final multimodal resin product having a density of 0.940 to 0.960 g/cm$^3$ and high load melt index of 2 to 50 g/10 min. The final resin is comprised of 30 to 55 weight percent first polyethylene resin and 45 to 70 weight percent second polyethylene resin.

The non-bridged indenoindolyl transition metal complex corresponds to the structure

where M is a Group 4 transition metal, $L_1$ is an indenoindolyl ligand, X is halogen and $L_2$ is a ligand selected from the group consisting of cyclopentadienyl, indenyl, indenoindolyl, fluorenyl, boraryl, azaborolinyl, and quinolinyl. The bridged indenoindolyl transition metal complex corresponds to the structure

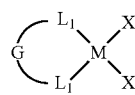

wherein G is a bridging group selected from the group consisting of $C_{1-4}$ alkylene, dialkylsilylene and diarylsilylene and M, $L_1$ and X are the same as defined for the non-bridged complex. The mole ratio of non-bridged to bridged complex in the mixed indenoindolyl single site catalyst ranges from 1.75:1 to 1:2. In a preferred embodiment the mixed catalyst is comprised of (5,10-dihydro-5,8-dimethylindeno[1,2-b]indol-10-yl)(cyclopentadienyl)zirconium dichloride and rac-ansa (methylene)bis(2,5-dimethyl-indeno[2,1-b]indolyl)zirconium dichloride.

In a preferred mode of operation the mixed single site catalyst is a supported catalyst and the polymerizations are carried out in an inert hydrocarbon diluent. Additionally, an activator and organoaluminum cocatalyst are preferably present with the mixed catalyst. Butene-1 is a particularly useful comonomer and may be present in either or both reactors. Hydrogen is utilized to control the molecular weight of the polymers produced in the first and second reactors.

DETAILED DESCRIPTION OF THE INVENTION

The multimodal PE resins of the invention are comprised of two different molecular weight PE components identified herein as the first PE component and the second PE component. In general terms and relative to each other, the first PE component is a lower molecular weight (MW), higher density resin and the second PE component is a higher MW, lower density resin.

The multimodal PE resins are produced in a two-stage cascade polymerization process wherein the first PE resin is produced in a first polymerization reactor and the second PE resin is produced in a second polymerization reactor. By two-stage cascade process is meant the two polymerization reactors are connected in series and resin produced in the first reactor is fed to the second reactor and is present during the formation of the second PE resin. Such processes are known and described in U.S. Pat. No. 4,357,448 which is incorporated herein by reference.

As used herein, the terms first reactor, "A" reactor, first polymerization zone or first reaction zone refer to the stage where the first relatively low molecular weight, high density PE (LMW HDPE) resin is produced. The terms second reactor, "B" reactor, second polymerization zone or second reaction zone refer to the stage where the second higher molecular weight, lower density PE (HMW PE) resin is produced. If the LMW HDPE and HMW PE are both copolymers, the amount of comonomer present in the second reactor is higher than that used in the first reactor.

Useful comonomers include $C_{3-8}$ α-olefins or mixtures thereof and butene-1, hexene-1 and octene-1 are particularly useful comonomers. In one highly useful embodiment of the invention butene-1 is copolymerized with ethylene in one or both of the reactors. Particularly useful multimodal film resins are obtained when the comonomer is butene-1.

The polymerizations are conducted as slurry processes in an inert hydrocarbon medium. Inert hydrocarbons useful for this purpose include saturated aliphatic hydrocarbons such as hexane, isohexane, heptane, isobutane and mixtures thereof. Hexane is a particularly useful diluent for the polymerizations.

Multimodal PE resins produced in accordance with the invention possess a unique balance of properties which make it possible to produce thin films using high stalk blown film processes at high output rates. This is possible due to the reduced extruder melt pressures exhibited by these resins and the superior bubble stability achieved. While the specific structural features enabling these improved results are not fully understood, they are believed to be the result of the cascade polymerization procedure and the specific combination of bridged and non-bridged single site indenoindolyl catalysts used.

Catalysts employed to produce the LMW HDPE/HMW PE multimodal resin compositions of the invention are indenoindolyl single site catalysts, i.e., indenoindolyl ligand-containing Group 4 transition metal complexes. Preferred Group 4 transition metals are zirconium and titanium. Zirconium is particularly preferred.

Indenoindolyl ligands are generated by deprotonating an indenoindole compound using a strong base. By indenoindole compound is meant an organic compound that has both indole and indene rings and wherein the five-membered rings are fused, i.e., they share two carbon atoms. Preferably, the rings are fused such that the indole nitrogen and the only sp³-hybridized carbon on the indenyl ring are "trans" to each other. Such is the case in an indeno[1,2-b]ring system:

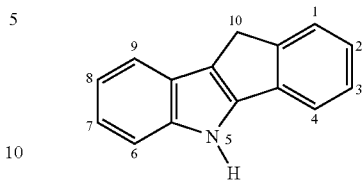

Suitable ring systems also include those, in which the indole nitrogen and the sp³-hybridized carbon of the indene are "cis" to each other, i.e., they are on the same side of the molecule. This is the case with an indeno[2,1-b]indole ring system:

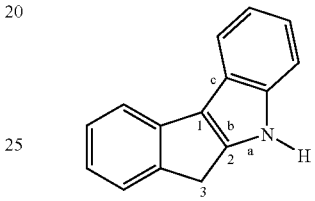

Methods for making indenoindole compounds are known. Suitable methods and compounds are disclosed, for example, in U.S. Pat. No. 6,232,260, the teachings of which are incorporated herein by reference.

The ring atoms can be substituted. Suitable indenoindolyl ligands include those represented by

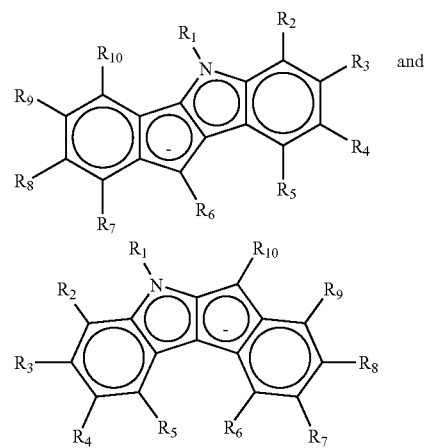

wherein $R_1$ is selected from the group consisting of $C_{1-6}$ alkyl, $C_{6-12}$ aryl and $C_{6-12}$ aralkyl and $R_2$ through $R_{10}$ is selected from the group hydrogen and $C_{1-6}$ alkyl. Most preferably, $R_1$ is methyl and $R_2$-$R_{10}$ are hydrogen or methyl.

The specific catalysts utilized to produce the improved LMW HDPE/HMW PE resin compositions of the invention, referred to herein as the mixed catalyst, are comprised of a non-bridged indenoindolyl transition metal complex and a bridged indenoindolyl transition metal complex. The non-bridged and bridged catalyst components are employed at ratios of 1.75:1 to 1:2 and, more preferably, at ratios from 1.5:1 to 1:1.5. Catalyst ratios provided herein are the mole ratio of non-bridged to bridged indenoindolyl catalyst components.

The non-bridged indenoindolyl transition metal catalyst corresponds to the structure:

where M represents the Group 4 transition metal, $L_1$ represents the indenoindolyl ligand, X is halogen and $L_2$ is a ligand selected from the group consisting of cyclopentadienyl, indenyl, indenoindolyl, fluorenyl, boraryl, azaborolinyl and quinolinyl. Most preferably, M is zirconium, $L_1$ is cyclopentadienyl and X is chlorine.

The bridged indenoindolyl transition metal catalysts have two indenoindolyl ligands bridged to one another and both are coordinated to the transition metal. Bridged indenoindolyl catalyst components correspond to the structure:

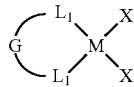

where M, $L_1$ and X are the same as defined above for the non-bridged catalyst and G is a bridging group covalently bonded to the indenoindolyl ligands. G is preferably $C_{1-4}$ alkylene, dialkylsilylene or diarylsilylene. Most preferably M is zirconium and X is chlorine. Particularly preferred bridging groups are methylene, ethylene, ethylidene, isopropylidene and dimethylsilylene.

In a particularly useful embodiment the non-bridged indenoindolyl catalyst is (5,10-dihydro-5,8-dimethylindeno[1,2-b]indole-10-yl)(cyclopentadienyl)zirconium dichloride and the bridged indenoindolyl catalyst is rac-ansa (methylene)bis (2,5-dimethyl-indeno[2,1-b]indolyl)zirconium dichloride.

The indenoindolyl catalysts are immobilized on supports. Preferably the non-bridged and bridged catalyst components are combined and then immobilized on the support. Techniques to support single-site catalysts are known. For instance, U.S. Pat. No. 6,211,311, which is incorporated herein by reference, discusses supporting heteroatomic ligand-containing single-site catalysts.

Useful supports include porous materials such as inorganic oxides and chlorides and organic polymer resins. Preferred supports include silica, alumina, silica-alumina, magnesia, titania, zirconia and magnesium chloride. Silica is most preferred.

Useful supports typically have surface areas in the range of about 2 to about 700 m²/g and, more preferably, from about 100 to about 600 m²/g, pore volumes in the range of about 0.1 to about 4.0 mL/g, average particle sizes in the range of about 1° to about 500 μm, and average pore diameters in the range of about 1 nm to about 100 nm. They are preferably modified by heat treatment, chemical modification, or both. For heat treatment, the support is preferably heated at a temperature from about 50° C. to about 800° C. and, more preferably, at temperatures from about 100° C. to about 300° C.

The supports may be chemically modified in accordance with known procedures by organoaluminum, organosilicon, organomagnesium and organoboron compounds. Hexamethyldisilazane and triethylborane are highly useful modifiers.

The supported mixed indenoindolyl single-site catalysts are used with an activator. Suitable activators include alumoxanes, alkyl aluminums, alkyl aluminum halides, anionic compounds of boron or aluminum, trialkylboron and triarylboron compounds and the like, as well as mixtures thereof. Examples include methyl alumoxane (MAO), polymeric MAO (PMAO), ethyl alumoxane, diisobutyl alumoxane, triethylaluminum, diethyl aluminum chloride, trimethylaluminum, triisobutyl aluminum, lithiumtetrakis(pentafluorophenyl)borate, dimethylanilinium tetrakis(pentafluorophenyl) borate, trityl tetrakis(pentafluorophenyl)borate, tris (pentafluorophenyl)borane, triphenylborane, tri-n-octylborane and the like and mixtures thereof. MAO, PMAO and mixtures of MAO or PMAO with tris(pentafluorophenyl) borane are preferred.

The activators can be combined with the catalyst components and the mixture immobilized on the support or the supported catalysts and activator can be added to the polymerization reactor separately. Activators are generally used in an amount from about 0.01 to about 10000 moles per mole of the mixed catalyst and, more preferably, from about 0.1 to about 1000 moles per mole.

Organoaluminum cocatalysts, while not necessary for polymerization, are preferably used with the mixed single site catalysts. Useful organoaluminum cocatalysts correspond to the general formula

wherein $R^1$ is a $C_1$-$C_8$ hydrocarbon group; Y is a halogen or an alkoxy group; and n is 1, 2 or 3 and include, for example, triethylaluminum (TEAL), tributylaluminum, triisobutylaluminum (TIBAL), diethylaluminum chloride, dibutylaluminum chloride, ethylaluminum sesquichloride, diethylaluminum hydride, diethylaluminum ethoxide and the like. TEAL and TIBAL are particularly useful cocatalysts.

More specifically for the process of the invention and to produce the improved multimodal PE film resins, ethylene is polymerized in the first reactor in the absence or presence of comonomer(s) targeting the formation of a LMW HDPE component having a density of 0.942 g/cm³ or above and $MI_2$ in the range 0.1 to 10 g/10 min. Target densities and $MI_2$s more typically range from 0.950 to 0.965 g/cm³ and 0.3 to 4 g/10 min, respectively. Particularly useful multimodal PE film resins are obtained when the LMW HDPE component has a density in the range 0.955 to 0.960 g/cm³ and $MI_2$ from 0.5 to 3 g/10 min. Densities referred to herein are determined in accordance with ASTM D 1505. $MI_2$ is determined according to ASTM D 1238 at 190° C. with 2.16 kg load.

Density and $MI_2$ of the resin are monitored during the course of the polymerization and feed rates and conditions adjusted as necessary to achieve the targeted values. In general, however, the temperature in the first reaction zone is in the range 140 to 180° F. and, more preferably, from 150 to 170° F. Concentrations of the mixed catalyst in the reaction zones will range from 0.010 to 0.20 ppm Zr and, more preferably from 0.040 to 0.10 ppm Zr. Cocatalysts are generally used in an amount from 15 to 100 moles per mole of catalyst and, more preferably, from about 20 to 70 moles per mole of catalyst. Hydrogen is used to control the molecular weight. The amount of hydrogen used will vary depending on the targeted $MI_2$; however, mole ratios of hydrogen to ethylene in the vapor space will typically range from 0.00005 to 0.008 and, more preferably, from 0.00009 to 0.002.

Polymerizate, i.e., polymerization mixture from the first reactor containing the LMW HDPE polymer, is fed to a second reactor where ethylene and at least one $C_{3-8}$ α-olefin comonomer are copolymerized to form the HMW PE copolymer. Prior to introducing the polymerizate from the first reactor to the second reactor, a portion of the volatile materials are removed. All or substantially all of the hydrogen is removed in this step since the amount of chain terminator, i.e., hydrogen, required to produce the HMW PE in the second reactor is substantially less than that required to produce LMW HDPE in the first reactor. Those skilled in the art will recognize, however, that unreacted monomer(s) and hydrocarbon diluent may also be removed with the hydrogen.

Reactor conditions in the second reactor will be different than those employed in the first reactor. Temperatures typically are maintained from 150 to 190° F. and, more preferably, from 160 to 180° F. Catalyst and cocatalyst levels present in the second reactor will vary depending on concentrations employed in the first reactor and whether optional catalyst and/or cocatalyst additions are made to the second reactor during the copolymerization. Comonomer is introduced with additional ethylene and hydrogen into the second reactor.

Whereas the LMW HDPE resin produced in the first reactor can be readily sampled and density and $MI_2$ monitored to control reactor conditions, the HMW PE copolymer is not available as a separate and distinct product. Rather, it is formed in intimate admixture with the LMW HDPE particles. Therefore, while it is possible to calculate the density and $MI_2$ of the HMW PE copolymer using established blending rules, it is more expedient to monitor the density and viscosity of the final resin blend and, if necessary, adjust and control conditions within the second reactor to achieve the targeted values for the final resin product.

Mole ratios of hydrogen to ethylene in the vapor space and comonomer to ethylene in the vapor space in the second reactor are therefore maintained based on the targeted density and the $MI_2$ or the high load melt index (HLMI) of the final multimodal PE resin product. In general, however, the mole ratio of hydrogen to ethylene in the vapor space in the second reactor will range from 0.00005 to 0.008. The mole ratio of comonomer to ethylene in the vapor space in the second reactor will vary depending on the comonomer used, however, in a preferred embodiment where the comonomer is butene-1, the mole ratio of comonomer to ethylene in the vapor space will range from 0.001 to 0.05.

Copolymerization in the second reactor is allowed to proceed so that the final multimodal resin product is comprised of from about 30 to 55 weight percent (wt. %) LMW HDPE and 45 to 70 wt. % HMW PE. In a highly useful embodiment, the multimodal resin blend has a composition ratio (CR) of 35 to 48 wt. % LMW HDPE and 52 to 65 wt. % HMW PE.

Multimodal PE resins produced in accordance with the above-described two-stage cascade polymerization process utilizing the mixed indenoindolyl single-site catalysts and having CR ratios of LMW HDPE component to HMW PE component within the above-prescribed limits will have densities in the range 0.940 to 0.960 g/cm³ and, more preferably, from 0.942 to 0.958 g/cm³. HLMIs typically range from 2 to 50 g/10 min and, more preferably, are from 7 to 30 g/10 min. In a particularly useful embodiment where the multimodal PE resins are ethylene-butene-1 copolymer resins, densities preferably range from 0.945 to 0.956 g/cm³ with HLMIs ranging from 7 to 20 g/10 min. HLMIs (also referred to as $MI_{20}$) are measured according to ASTM D1238 at 190° C. with a load of 21.6 kg.

The following examples illustrate the invention more fully. Those skilled in the art will, however, recognize numerous variations that are within the spirit of the invention and scope of the claims.

EXAMPLE 1

Preparation of Supported Mixed Indenoindolyl Catalyst

A non-bridged indenoindolyl catalyst component, (5,10-hydro-5,8-dimethylindeno[1,2-b]indole-10-yl)(cyclopentadienyl)zirconium dichloride, was prepared in accordance with the procedure of Example 2 of published U.S. patent application 2007/0055021A. The non-bridged indenoindolyl catalyst is abbreviated "NBC" in the examples and tables which follow.

A bridged indenoindolyl catalyst component, rac-ansa (methylene)bis(2,5-dimethyl-indeno[2,1-b]indolyl)zirconium dichloride, was prepared in accordance with the procedure described in Example 1 of published U.S. patent application 2007/0293639A. The bridged indenoindolyl catalyst component is abbreviated "BC" in the examples and tables which follow.

Silica (Fuji G-3) was calcined under flowing nitrogen for 16 h at 200° C. Methylalumoxane (1.9 mL of a 30 wt % solution in toluene, a product of Albemarle) was dissolved in 30 mL of toluene. This toluene solution was then added to 8.97 g of the calcined silica. The mixture was stirred at ambient temperature for 1 h and then at 110° C. for 3 h. The volatiles were removed under vacuum to produce 10.34 g of silica support.

NBC (0.0228 g, 0.049 mmol), BC (0.0309 g, 0.048 mmol) and 3.7 mL of methylalumoxane solution (30 wt % in toluene, 17.42 mmol) were dissolved in 30 mL toluene at room temperature. This afforded a dark magenta solution. The mixture was added to a slurry of the above treated silica (2.37 g) in toluene (10 mL) after one hour. The slurry was stirred for 2 h and the volatiles were removed under vacuum. The solid was washed with hexanes (3×40 mL) and dried to yield a free-flowing supported mixed catalyst powder (3.44 g) which contained 18.4 wt % Al and 0.28 wt % Zr. The mole ratio of the indenoindolyl catalyst components (NBC:BC) was 1:1.

EXAMPLE 2

Polymerization of Polyethylene Resin

Ethylene, butene-1, hexane, the supported mixed catalyst from Example 1, TIBAL cocatalyst and hydrogen were continuously fed into a first 100 gallon stirred tank reactor to make a LMW HDPE resin. The reactor contained 80 gallons of reaction mixture. A small amount of anti-static agent (Armostat™ 710) was also added. Feed rates and polymerization conditions in the first reactor were as follows:

| | |
|---|---|
| Temperature | 160° F. |
| Pressure | 79 psig |
| Ethylene | 30 lb/hr |
| Butene-1 | 0.19 lb/hr |
| Hexane | 193 lb/hr |
| Catalyst | 2.57 g/hr |
| Cocatalyst | 0.47 g/hr |
| Anti-stat | 3.41 g/hr |
| $H_2$/Ethylene mole ratio | 0.0012 |

Polymerizate, i.e., reaction mixture, from the first reactor was continuously removed and transferred to a flash drum where hydrogen and ethylene were removed. The slurry recovered from the flash drum was transferred to a second 100 gallon stirred tank reactor where a higher MW lower density PE resin (HMW PE) was produced in the presence of the LMW HDPE polymer particles. The second reactor contained 80 gallons of reaction mixture. Feed rates and conditions employed in the second reactor were as follows:

| | |
|---|---|
| Temperature | 170° F. |
| Pressure | 133 psig |
| Ethylene | 35 lb/hr |
| Butene-1 | 0.26 lb/hr |
| Hexane | 100 lb/hr |
| Catalyst | no additional catalyst added |
| Cocatalyst | 0.97 g/hr |
| Anti-stat | 1.95 g/hr |
| $H_2$/Ethylene mole ratio | 0.00022 |

A multimodal PE polymer powder, which consisted of an intimate blend comprised of 46 wt. % LMW HDPE and 54 wt. % HMW PE components, was produced at a rate of 65 lbs/hr.

Melt indexes and densities of the LMW HDPE and HMW PE components produced in the first and second reactors are reported below:

| | |
|---|---|
| LMW HDPE $MI_2$ | 1.03 g/10 min |
| LMW HDPE density | 0.9560 g/cm$^3$ |
| HMW PE $MI_2$ | 0.0189 g/10 min |
| HMW PE density | 0.9490 g/cm$^3$ |

While it is possible to obtain these values directly for the LMW HDPE, the HMW PE component is produced in intimate admixture with the LMW HDPE polymer particles and therefore is not directly available for testing. Accordingly, density and $MI_2$ of the HMW PE are calculated values obtained utilizing established blending rules. Such blending rules are described in detail in *Polym. Eng. Sci.* 31(21), 1549-1552 (1991) and references contained therein. For example, the powder density is calculated as follows:

$$\frac{1}{\rho_{blend}} = \frac{W_A}{\rho_A} + \frac{W_B}{\rho_B}$$

where $\rho_{blend}$ is the blend density, $\rho_A$ is the "A" reactor density, $\rho_B$ is the "B" reactor density, $W_A$ is the weight fraction of the blend made in the "A" reactor, and $W_B$ is the weight fraction of the blend made in the "B" reactor.

The dried polymer powder was compounded with 1000 ppm calcium stearate and 2000 ppm of a stabilizer consisting of a 50:50 blend of hindered phenolic and phosphite antioxidants and pelletized using a Farrel mixer and extruder. Properties of the finished polymer pellets were as follows:

| | |
|---|---|
| $MI_2$ | 0.119 g/10 min |
| HLMI | 18 g/10 min |
| MFR | 151 |
| Density | 0.9499 g/cm$^3$ |

Melt index is an indicator of molecular weight whereas melt flow ratio (MFR) indicates the molecular weight distribution. A lower $MI_2$ and/or HLMI indicate a higher molecular weight and a higher MFR indicates a broader molecular weight distribution. MFR is the ratio of HLMI to $MI_2$. $MI_2$ and HLMI are determined according to ASTM D 1238. $MI_2$ is measured at 190° C. under 2.16 kg load and HLMI is measured at 190° C. under 21.6 kg load.

To demonstrate its improved processing characteristics, the multimodal resin was utilized to produce a thin film in a high stalk blown film extrusion process. The bubble stability was evaluated during the film blowing process. Due to the increased stalk or neck height of the "bubble" produced in such processes, good bubble stability is essential. Bubble instability, i.e., where the bubble wobbles in a side-to-side or up-and-down motion, results in variability in film thickness and in a worst case scenario, breakage of the bubble requiring temporary shutdown of the production line. Bubble stability is evaluated using a numerical rating system similar to that described in U.S. Pat. No. 6,486,270.

To demonstrate the improved processability of the multimodal resin, a thin (0.5 mil) film was produced on a 120 mm Kiefel high stalk blown film line equipped with a 60 mm single screw grooved feed extruder having four heating zones and a 120 mm spiral mandrel die with 1.2 mm die gap. Screw-speed was 65 rpm. The die had five heated zones and cooling air was supplied to the blown film via a single-lip air ring. The blow-up ratio (BUR) was 4 and neck height was 6 die diameters (720 mm). Take-up speed of the nip rolls was initially set at 215 feet/minute. Film produced under these conditions is assigned a bubble stability rating of 25. The take-up speed is then increased 25 feet per minute. If film production is maintained for about 3 minutes at the increased take-up rate, 3 points are added to the bubble stability rating and the procedure is repeated. The test is continued until oscillation of the bubble becomes so severe that the bubble tears or breaks. The more cycles, i.e., increases in take-up speed, that the resin can withstand, the higher the bubble stability rating will be. The higher the bubble stability rating, the better the processability and draw down capability of the resin will be. The multimodal resin of the invention had a bubble stability rating of 61.

By way of comparison, a commercial HMW HDPE bimodal Ziegler-Natta ethylene-butene-1 copolymer (Alathon™ L5005) widely used for the production of thin films had a bubble stability rating of only 43 when evaluated under identical conditions. This is surprising in view of the lower $MI_2$ (0.057 g/10 min) of the commercial resin compared to that of the inventive resin (0.119 g/10 min). Higher $MI_2$, i.e., lower MW, is generally associated with lower bubble stability in high stalk film extrusion. The ability to achieve higher bubble stability at higher $MI_2$ is particularly advantageous since it enables the processor to increase the screw speed to increase output without exceeding the pressure limits of the equipment.

Elmendorf tear strengths in the machine direction (MD) and transverse direction (TD) and total energy dart drop (TEDD) properties of the 0.5 mil film produced from the multimodal resin were determined in accordance with ASTM D 1922 and ASTM D 4272, respectively, with the following results:

| | |
|---|---|
| MD Tear strength | 62 grams |
| TD Tear strength | 9 grams |
| TEDD | 0.98 ft-lbs |

EXAMPLE 3

To demonstrate the versatility of the process, Example 2 was repeated except that the conditions were selected to target formation of resin having a narrower molecular weight distribution and higher density. Feed rates and reactor conditions used were as follows:

|  | First Reactor | Second Reactor |
| --- | --- | --- |
| Temperature (° F.) | 160 | 170 |
| Pressure (psig) | 56 | 121 |
| Ethylene (lb/hr) | 20 | 35 |
| Butene-1 (lb/hr) | — | 0.75 |
| Hexane (lb/hr) | 193 | 100 |
| Catalyst (g/hr) | 3.07 | — |
| Cocatalyst (g/hr) | 0.93 | 0.93 |
| Anti-Stat (g/hr) | 4.10 | 2.04 |
| $H_2$/Ethylene mole ratio | 0.0013 | 0.00014 |

The resulting multimodal resin blend was comprised of 36 wt. % LMW HDPE produced in the first reactor and 64 wt. % HMW PE produced in the second reactor. Properties of the finished polymer pellets and bubble stability rating were as follows:

| $MI_2$ (g/10 min) | 0.108 |
| --- | --- |
| HLMI (g/10 min) | 9.3 |
| MFR | 86 |
| Density (g/cm$^3$) | 0.9560 |
| Bubble Stability Rating | 59 |

COMPARATIVE EXAMPLE 4

To show the effect of the mixed catalyst on the processing characteristics of the resin, a supported mixed catalyst was prepared in accordance with the procedure of Example 1 except that the mole ratio of the indenoindolyl catalyst components (NBC:BC) was 2:1. The supported catalyst was used to produce multimodal PE polymer in accordance with the two-stage cascade polymerization procedure of Example 2 wherein the feed rates and reactor conditions were as follows:

|  | First Reactor | Second Reactor |
| --- | --- | --- |
| Temperature (° F.) | 160 | 160 |
| Pressure (psig) | 50 | 109 |
| Ethylene (lb/hr) | 30 | 35 |
| Butene-1 (lb/hr) | — | 1.18 |
| Hexane (lb/hr) | 193 | 100 |
| Catalyst (g/hr) | 3.52 | — |
| Cocatalyst (g/hr) | 2.00 | 1.00 |
| Anti-Stat (g/hr) | 8.20 | 3.54 |
| $H_2$/Ethylene mole ratio | 0.00152 | 0.00009 |

Properties of the finished pelletized multimodal resin (composition ratio 46 wt. % LMW HDPE/54 wt. % HMW PE) and bubble stability rating obtained with resin were as follows:

| $MI_2$ (g/10 min) | 0.079 |
| --- | --- |
| HMLI (g/10 min) | 7.6 |
| MFR | 96 |
| Density (g/cm$^3$) | 0.9490 |
| Bubble Stability Rating | 31 |

The significantly inferior bubble stability rating of the comparative resin to those of the Example 2 or Example 3 resins is readily apparent from the above results.

COMPARATIVE EXAMPLE 5

The following example is provided to demonstrate the superior processability of multimodal resins produced using the mixed catalysts of the invention wherein both of the ligands of the bridged catalyst component are indenoindolyl ligands. In this example a mixed supported catalyst was prepared following the procedure of Example 1.

The non-bridged indenoindolyl catalyst component and NBC:BC molar ratio were the same as used in Example 1. The bridged indenoindolyl catalyst component was dimethylsilyl-bridged indeno[1,2-b]indolylcyclopentadienyl zirconium dichloride. In other words, only one of the ligands of the bridged catalyst was an indenoindolyl ligand. The other ligand was a cyclopentadienyl ligand. The bridged indenoindolyl catalyst component used for this comparative example was prepared following the procedure of Example 1 of published U.S. patent application 2007/0293639A.

Multimodal PE resin was produced using the comparative supported mixed catalyst in accordance with the above-described procedures. Feed rates and conditions in the reactors were as follows:

|  | First Reactor | Second Reactor |
| --- | --- | --- |
| Temperature (° F.) | 160 | 170 |
| Pressure (psig) | 52 | 119 |
| Ethylene (lb/hr) | 27 | 41 |
| Butene-1 (lb/hr) | 0.30 | 0.75 |
| Hexane (lb/hr) | 169 | 100 |
| Catalyst (g/hr) | 18.2 | — |
| Cocatalyst (g/hr) | 1.87 | 1.31 |
| Anti-Stat (g/hr) | 2.04 | 2.04 |
| $H_2$/Ethylene mole ratio | 0.0013 | 0.000056 |

The pelletized multimodal resin produced (43 wt. % LMW HDPE/57 wt. % HMW PE) had a HLMI of 8.2 g/10 min and density of 0.9483 g/cm$^3$. When evaluated for bubble stability in the high stalk film extrusion test, the comparative resin had a bubble stability rating of only 31.

EXAMPLE 6

A multimodal ethylene-octene-1 copolymer was produced using the supported mixed catalyst of Example 1 and the polymerization procedure of Example 2. Reactor conditions and feed rates were as follows:

|  | First Reactor | Second Reactor |
| --- | --- | --- |
| Temperature (° F.) | 160 | 170 |
| Pressure (psig) | 105 | 126 |
| Ethylene (lb/hr) | 30 | 35 |
| Octene-1 (lb/hr) | — | 1.71 |
| Hexane (lb/hr) | 193 | 100 |

-continued

|  | First Reactor | Second Reactor |
| --- | --- | --- |
| Catalyst (g/hr) | 3.68 | — |
| Cocatalyst (g/hr) | 0.41 | 1.93 |
| Anti-Stat (g/hr) | 4.09 | 2.04 |
| $H_2$/Ethylene mole ratio | 0.0013 | 0.0004 |

The resin produced (46 wt. % LMW HDPE/54 wt. % HMW PE) had an HLMI of 10.1 g/10 min and density of 0.9521 g/cm$^3$. The resin was easily processed to produce biaxially oriented thin (0.5 mil) film on the high stalk blown film line. The resin had a bubble stability rating of 61. MD and TD tear values for the film were 41 and 10 g, respectively, and the TEDD value was 1.11 ft-lbs.

EXAMPLE 7

Since it is well known that film processors often incorporate fillers, such as calcium carbonate, into film resins to reduce cost and increase stiffness, this example is provided to demonstrate the ability to achieve good bubble stability when the resins of the invention are formulated with a filler. For the example, 84 parts of the multimodal resin of Example 2 was blended with 8 parts linear low density polyethylene (MI$_2$ 1.0 g/10 min; density of 0.918 g/cm$^3$) and 10 parts of a commercial calcium carbonate masterbatch (HM 10 Max available from Heritage Plastics; 80% calcium carbonate in a LLDPE carrier). The bubble stability rating obtained was 58. This compares favorably with the 61 bubble stability rating obtained with the unfilled resin of Example 2.

We claim:

1. A process for making multimodal polyethylene resin comprising:
   (a) polymerizing ethylene or mixture of ethylene and $C_{3-8}$ α-olefin in a first reactor in the presence of hydrogen and a catalyst system comprised of a supported mixed indenoindolyl single site catalyst comprised of (5,10-dihydro-5,8-dimethylindeno[1,2-b]indole-10-yl)(cyclopentadienyl) zirconium dichloride and rac-ansa (methylene) bis(2,5-dimethyl-indeno[2,1-b]indolyl)zirconium dichloride, and an activator, to produce a polymerizate containing a first polyethylene resin having a density of 0.942 g/cm$^3$ or greater and MI$_2$ from 0.1 to 10 g/10 min;
   (b) removing substantially all hydrogen from the polymerizate and transferring to a second reactor; and
   (c) polymerizing ethylene and a $C_{3-8}$ α-olefin in the second reactor to produce a second polyethylene resin of relatively higher molecular weight and lower density than said first polyethylene resin and obtain a multimodal polyethylene resin product comprised of 30 to 55 weight percent first polyethylene resin and 45 to 70 weight percent second polyethylene resin and having a density from 0.940 to 0.960 g/cm$^3$ and HLMI from 2 to 50 g/10 min.

2. The process of claim 1 wherein the mixed indenoindolyl single site catalyst is immobilized in an inorganic support selected from the group consisting of silica, alumina, silica-alumina, magnesia, titania, zirconia and magnesium chloride and the mole ratio of nonbridged to bridged indenoindolyl catalyst components is from 1.75:1 to 1:2.

3. The process of claim 2 wherein the multimodal resin product has a density from 0.942 to 0.958 g/cm$^3$, HLMI from 7 to 30 g/10 min and is comprised of 35 to 48 weight percent first polyethylene resin and 52 to 65 weight percent second polyethylene resin.

4. The process of claim 3 wherein the multimodal polyethylene resin has a density from 0.945 to 0.956 g/cm$^3$ and HLMI from 7 to 20 g/cm$^3$.

5. The process of claim 1 wherein the polymerizations are carried out in an inert hydrocarbon.

6. The process of claim 1 wherein ethylene is polymerized in the first reactor and a mixture of ethylene and $C_{3-8}$ α-olefin are polymerized in the second reactor.

7. The process of claim 1 wherein the α-olefin is butene-1.

8. The process of claim 1 wherein the catalyst system includes an organoaluminum cocatalyst of the formula $$AlR^1{}_nY_{3-n}$$

wherein R$^1$ is a $C_{1-8}$ hydrocarbon group, Y is a halogen or alkoxy group and n is 1, 2 or 3.

9. The process of claim 8 wherein the organoaluminum cocatalyst is triethylaluminum or triisobutylaluminum.

* * * * *